United States Patent
Bridges (10) Patent No.: US 7,175,771 B2
(45) Date of Patent: Feb. 13, 2007

(54) MULTI-STAGE CENTRIFUGAL DEBRIS TRAP

(75) Inventor: Eric B. Bridges, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 418 days.

(21) Appl. No.: 10/741,778

(22) Filed: Dec. 19, 2003

(65) Prior Publication Data

US 2005/0133466 A1 Jun. 23, 2005

(51) Int. Cl.
*B04B 1/02* (2006.01)
*B04B 7/08* (2006.01)

(52) U.S. Cl. ........... 210/787; 210/223; 210/304; 210/360.1; 210/380.1; 210/456; 494/36; 494/37; 494/43

(58) Field of Classification Search ........... 184/6.11, 184/6.25; 210/695, 787, 222, 223, 304, 360.1, 210/456, 380.1; 494/36, 37, 43
See application file for complete search history.

(56) References Cited

U.S. PATENT DOCUMENTS

| | | | |
|---|---|---|---|
| 2,688,437 A | 9/1954 | Monnet | |
| 3,211,530 A | 10/1965 | Harvey | |
| 3,282,498 A | 11/1966 | Smith | |
| 3,432,091 A | 3/1969 | Beazley | |
| 3,478,887 A | 11/1969 | Ohberg | |
| 3,722,691 A | 3/1973 | Francois | |
| 4,046,315 A | 9/1977 | Klingenberg | |
| 4,084,825 A * | 4/1978 | Ludwig | 277/348 |
| 4,142,671 A | 3/1979 | Ivin | |
| 4,170,873 A * | 10/1979 | Milo | 184/6.11 |
| 4,221,323 A | 9/1980 | Courtot | |
| 4,253,953 A | 3/1981 | Libertini | |
| 4,284,504 A | 8/1981 | Alexander | |
| 4,342,546 A | 8/1982 | Rehfeld | |
| 4,344,561 A | 8/1982 | Iizuka | |
| 4,346,009 A | 8/1982 | Alexander | |

(Continued)

FOREIGN PATENT DOCUMENTS

DE 1133321 7/1962

(Continued)

OTHER PUBLICATIONS

International Search Report Mar. 30, 2005.

*Primary Examiner*—David A. Reifsnyder
(74) *Attorney, Agent, or Firm*—Ingrassia Fisher & Lorenz (57) ABSTRACT

A centrifugal debris trap includes a cylindrical chamber bound by an inner surface of a continuous wall radially disposed about a center axis at a first inner diameter, and having a first wall end and a second wall end; and a plurality of grooves between the first and second wall ends, extending radially outward from the inner surface into a portion of the continuous wall, and each having a groove outer diameter that is greater than the first inner diameter. The cylindrical chamber is sealed at the first wall end by a back plate attached about a circumference of the first wall ends, and is open at the second wall end through a ring attached thereto about a circumference of the second wall end. The ring has a ring opening radially disposed about the center axis, and a second inner diameter less than the first inner diameter.

27 Claims, 9 Drawing Sheets

U.S. PATENT DOCUMENTS

| | | |
|---|---|---|
| 4,375,365 A | 3/1983 | Muller |
| 4,375,366 A | 3/1983 | Muller |
| 4,431,540 A | 2/1984 | Budzich |
| 4,446,021 A | 5/1984 | Aufderhaar |
| 4,464,982 A | 8/1984 | Leuschner |
| 4,472,276 A | 9/1984 | Taylor |
| 4,473,002 A | 9/1984 | Leuschner |
| 4,534,863 A | 8/1985 | Bacon |
| 4,557,831 A | 12/1985 | Lindsay |
| 4,625,133 A | 11/1986 | Lobsinger |
| 4,722,792 A | 2/1988 | Miyagi |
| 4,780,061 A | 10/1988 | Butterworth |
| 4,923,491 A | 5/1990 | Lawless |
| 4,975,188 A | 12/1990 | Brunsell |
| 5,013,342 A | 5/1991 | Leussler |
| 5,085,771 A | 2/1992 | Huang |
| 5,096,581 A | 3/1992 | Purvey |
| 5,176,825 A | 1/1993 | Hadjus |
| 5,203,999 A | 4/1993 | Hugues |
| 5,232,588 A | 8/1993 | Gryder |
| 5,246,600 A | 9/1993 | Reichner |
| 5,368,746 A | 11/1994 | Gryder |
| 5,372,730 A | 12/1994 | Warner |
| 5,431,814 A | 7/1995 | Jorgensen |
| 5,567,321 A | 10/1996 | Webster |
| 5,707,519 A | 1/1998 | Miller |
| 5,713,827 A | 2/1998 | Errington |
| 5,755,657 A | 5/1998 | Millson |
| 5,779,618 A | 7/1998 | Onodera |
| 5,785,849 A | 7/1998 | Mules |
| 5,882,529 A | 3/1999 | Gupta |
| 5,906,733 A | 5/1999 | Purvey |
| 5,954,071 A | 9/1999 | Magliocca |
| 6,068,707 A | 5/2000 | Magliocca |
| 6,090,276 A | 7/2000 | Ford |
| 6,155,805 A | 12/2000 | Fry |
| 6,156,193 A | 12/2000 | Meinhold |
| 6,210,311 B1 | 4/2001 | May |
| 6,213,929 B1 | 4/2001 | May |
| 6,217,776 B1 | 4/2001 | Ohkawa |
| 6,251,153 B1 | 6/2001 | Neitzel et al. |
| 6,296,765 B1 | 10/2001 | Brown |
| 6,306,221 B1 | 10/2001 | Magliocca |
| 6,348,087 B1 | 2/2002 | Aslin |
| 6,364,822 B1 | 4/2002 | Herman |
| 6,398,877 B1 | 6/2002 | Magliocca |
| 6,423,225 B2 | 7/2002 | Wong |
| 6,428,700 B1 | 8/2002 | Brown |
| 6,464,455 B2 | 10/2002 | Wilson |
| 6,484,847 B2 | 11/2002 | Paczuski |
| 6,517,475 B1 | 2/2003 | Brown |
| 6,579,218 B1 | 6/2003 | May |
| 6,846,411 B2 * | 1/2005 | Elsegood .................... 210/222 |

FOREIGN PATENT DOCUMENTS

FR         2688574        9/1993

* cited by examiner

MULTI-STAGE CENTRIFUGAL DEBRIS TRAP

BACKGROUND OF THE INVENTION

The present invention generally relates to apparatus and method for separating debris from a liquid stream, and more specifically, to a centrifugal debris trap useful to remove abrasive debris from a lubricating oil in an engine.

During manufacture and/or repair of an engine or other components, various forms of debris, referred to as build-related debris, may be inadvertently incorporated therein. The types of debris may include abrasive materials such as metal shavings, dust, casting sand, and the like. Build related and other types of debris may be difficult to control and remove, in that they may remain within passages and conduits of various engine components in spite of attempts which may be made to remove such materials prior to engine startup.

In an example, debris may be located downstream of a filtration system. Such debris may potentially damage parts which may be critical to engine operation prior to the debris being caught by the filtration system. For example, debris located after a filtration system but prior to main shaft rotor bearings in, for example, a gas turbine, may result in a failed main shaft rotor bearing, which may result in destruction of an entire engine rotor group and/or destruction of various components such as a stator/shroud structure integral to an engine. Bearing and other damage which may be caused by build-related debris may thus be considered a major source of premature bearing failure, and may also result in increased maintenance costs, warranty costs, and the like.

Debris may also be formed from various parts of an engine wearing during use. As with build-related debris, this debris may be difficult to control as it may be present after a filtration system but prior to, for example, a component requiring lubrication such as a bearing. Such debris may also result in damage to a component and/or failure of an engine or system.

Figure 1:
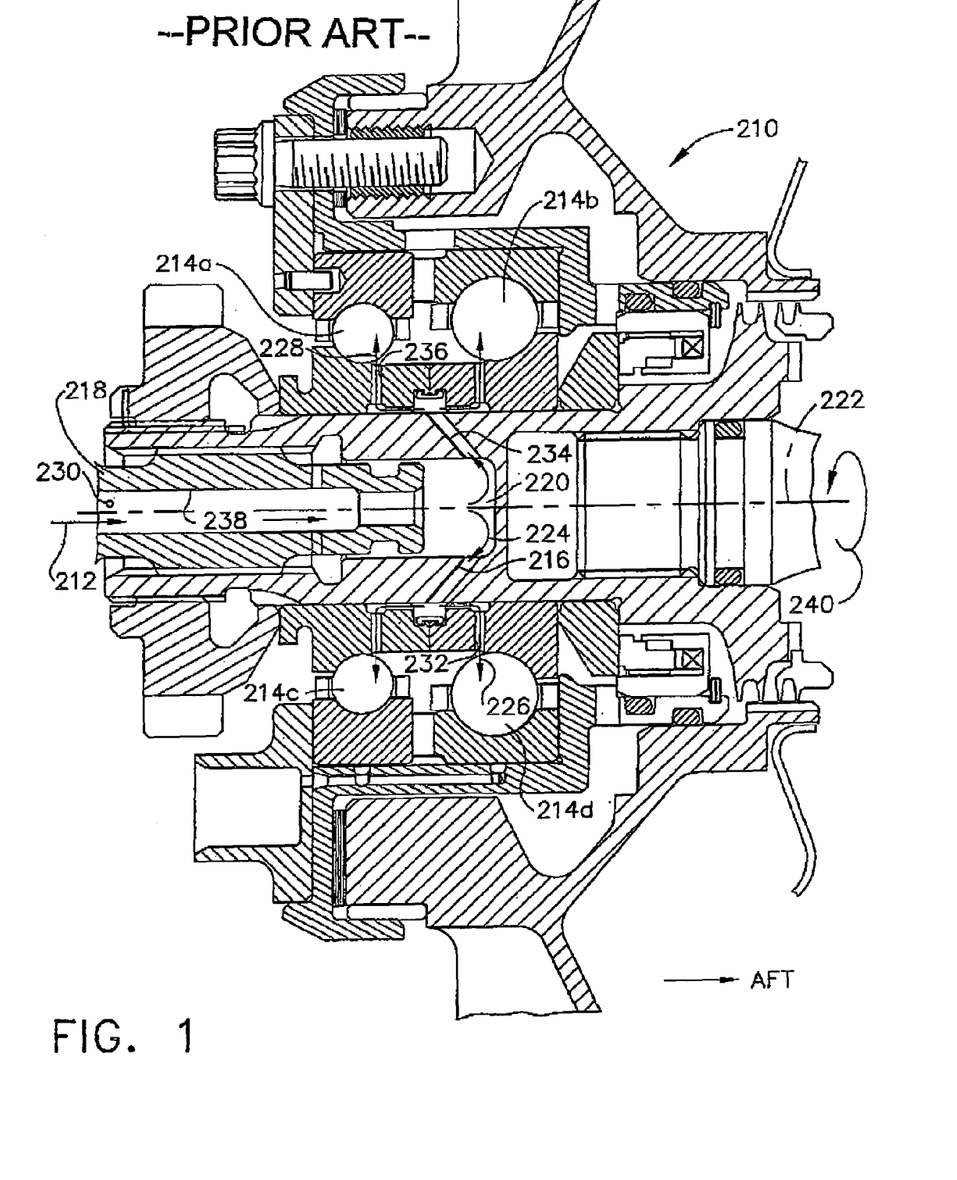
FIG. 1 is a cross-sectional plan view of a rotating shaft oil lubrication system without a debris trap.

Taking as an example, FIG. 1 shows a cross-sectional plan view of a rotating shaft oil lubrication system, generally referred to as 210, which may be representative of a system that may not provide for removal of debris post a filtration system (not shown). In system 210, a fluid 212 may be distributed to one or more bearing assemblies which may include one or more bearings 214a, 214b, 214c, 214d via a plurality of conduits 216, 232, 234, 236, and 238. As shown, fluid 212 may travel along a flow path 226 and/or along a flow path 228 thorough a rotating spline shaft 218 into a rotating chamber 220, all of which may be rotating along a center axis 222 at a rotational speed 240. The centrifugal force 224 acting on fluid 212 may propel fluid 212 through the plurality of conduits 216, 232, 234, 236 and 238 such that fluid 212 may contact bearings 214a–d thus providing lubrication thereto. Accordingly, any debris 230 which may be disposed within flow path 226 and/or flow path 228, or oil supply passages (not shown) that feed oil to rotating spline shaft 218, may come in contact with bearings 214a, 214b, 214c, and/or 214d, which may lead to damage of bearings 214a–d, and/or other parts of system 210.

Various attempts at removing debris from engines include U.S. Pat. No. 3,478,887, which is directed to a combination centrifugal and magnetic separation device. The separator device disclosed therein may include a cylindrical housing mounted in a slide valve for rotation therewith. The housing may be provided with end faces with an inlet aperture and an outlet aperture disposed as a plurality of openings angularly spaced on a circle circumferentially of an axis of rotation of the separator device. Each of the housing parts may have a respective inwardly directed axial pin portion between which an annular magnet may be disposed circumferentially thereof projecting into a contaminant separating chamber defined by a housing. During operation, ferromagnetic particles may be separated from a fluid flow by collecting on a surface of a magnet, while other solid contaminants, which may not be magnetic, may be separated by centrifugal action. Contaminants collect on the inner wall of the housing defining an outer circumference of the separating chamber.

Unlike the present invention, the separation device disclosed in the reference may require a slide valve, a commutating valve arrangement, or the like for operation. If such an arrangement is not present on a system, it may need to be incorporated into the design of the device, or may require the separator being located external to a component being protected, both of which may add complexity to a system. Furthermore, the flow path of the device shown in the reference may have an inlet and a separate outlet, which may be essentially in-line with one another. Under certain conditions which may include relatively high flow rates as determined relative to the separation device, the liquid may flow essentially straight through the separator described by the reference without any centrifugal filtration. Thus, efficiency of the prior art separator device may depend on the flow rate of the liquid passing through the device.

U.S. Pat. No. 6,484,847 is directed to a hermetic compressor assembly, comprising a pivoting magnetic member in fluid communication with a liquid lubricant, wherein at least a portion of any ferrous particles contained in a liquid lubricant may be attracted to, and may be retained by, the magnetic member. While the magnetic member may retain a portion of the ferrous particles present, the magnetic member may not address removal of non-ferrous materials such as casting sand and other abrasive materials as described above. Furthermore, the flow of the liquid lubricant may be essentially straight through the magnetic member shown. Accordingly, the efficiency of the separation of debris from a liquid flowing through the device may be dependent on an amount of communication the fluid may have with the magnetic member. The more surface area the magnetic member may have, the more communication between the fluid and the magnetic member that may result. Should such space not be available within a system or engine in which such a magnetic member is to be located, the magnetic member may require additional systems or space to be accommodated, which may add complexity to the system.

As can be seen, there is a need for apparatus and method of trapping build related and other types of both ferrous and non-ferrous debris that may be located in, for example a lubrication fluid which may be between a filtration system and a component to be lubricated therewith. There is also a need for apparatus and method of trapping build related and other types of debris which may not have a flow path between a separate inlet and outlet, and may thus provide for debris separation which is not substantially affected by the rate at which a fluid flows through the debris apparatus. Moreover, there is a need for apparatus and method of trapping build related and other types of debris which is integral to the device or system such that it does not add appreciable complexity to a system in which it is located.

SUMMARY OF THE INVENTION

In one aspect of the present invention, a centrifugal debris trap comprises a cylindrical chamber bound by an inner surface of a continuous wall radially disposed about a center axis at a first inner diameter; the inner surface separated from an outer surface of the continuous wall by a wall thickness; the continuous wall having a first wall end longitudinally separated along the center axis from a second wall end by a length; a plurality of grooves located between the first wall end and the second wall end; the plurality of grooves extending radially outward from the inner surface into a portion of the continuous wall; each of the plurality of grooves having a groove outer diameter that is greater than the first inner diameter; the cylindrical chamber being sealed at the first wall end by a back plate attached about a circumference of the first wall end; the cylindrical chamber being open at the second wall end through a ring attached to the second wall end about a circumference of the second wall end; the ring having a ring opening radially disposed about the center axis; and the ring opening having a second inner diameter less than the first inner diameter.

In another aspect of the present invention, a centrifugal debris trap comprises: a cylindrical chamber bound by an inner surface of a continuous wall concentrically disposed about a center axis at a first inner diameter; the inner surface separated from an outer surface of the continuous wall by a wall thickness; the continuous wall having a first wall end longitudinally separated along the center axis from a second wall end by a wall length; the cylindrical chamber being sealed at the first wall end by a back plate attached about a circumference of the first wall end; a plurality of grooves located between the first wall end and the second wall end; the plurality of grooves extending radially outward from the inner surface into a portion of the continuous wall; each of the plurality of grooves having a groove outer diameter that is greater than the first inner diameter; the cylindrical chamber being open at the second wall end through a ring attached to the second wall end about a circumference of the second wall end; the ring comprising: a ring opening radially disposed about, and concentric to the center axis; the ring opening having a second inner diameter that is less than the first inner diameter; the ring having a first outer ring diameter greater than an outer diameter of the outer surface of the continuous wall; the ring having a plurality of teeth extending radially outward from the first outer ring diameter forming a discontinuous toothed ring concentric with the ring opening; and the toothed ring having a second outer ring diameter greater than the first outer ring diameter.

In still another aspect of the present invention, a centrifugal debris trap comprises: a cylindrical chamber bound by an inner surface of a continuous wall concentrically disposed about a center axis at a first inner diameter; the inner surface separated from an outer surface of the continuous wall by a wall thickness; the continuous wall having a first wall end longitudinally separated along the center axis from a second wall end by a wall length; the cylindrical chamber being sealed at the first wall end by a back plate attached about a circumference of the first wall end; a plurality of grooves located between the first wall end and the second wall end; the plurality of grooves extending radially outward from the inner surface into a portion of the continuous wall; each of the plurality of grooves having a groove outer diameter such that a ratio of the groove outer diameter to the first inner diameter is about 1.01 or greater; the cylindrical chamber being open at the second wall end through a ring attached to the second wall end about a circumference of the second wall end; the ring comprising: a ring opening radially disposed about, and concentric to the cylindrical chamber; the ring opening having a second inner diameter such that a ratio of the first inner diameter to the second inner diameter is about 1.01 or greater; the ring having a first outer ring diameter such that a ratio of the first outer ring diameter to an outer diameter of the outer surface of the continuous wall is about 1.01 or greater; the ring having a plurality of teeth extending radially outward from the first outer ring diameter forming a discontinuous toothed ring concentric with the ring opening; the toothed ring having a second outer ring diameter greater than the first outer ring diameter; and the ring having a plurality of spacing teeth extending longitudinally along the center axis outwardly from the ring in a direction opposite of the cylindrical chamber, wherein: an outer diameter of the back plate is dimensioned to frictionally engage a portion of a chamber disposed within a housing such that the debris trap is removable from the housing, and wherein the second outer ring diameter of the discontinuous toothed ring is dimensioned to engage a portion of the housing to position the debris trap within a portion of the chamber.

In still another aspect of the present invention, a gas turbine comprises: a rotating shaft liquid lubrication system comprising a liquid filter in serial fluid communication with a bearing via a lubricating liquid; the system further comprising a rotating debris trap in fluid communication with, and serially disposed after the filter and before the bearing such that the lubricating liquid flowing from the filter enters the rotating debris trap through a ring opening and exits the rotating debris trap through the ring opening, prior to the lubricating fluid contacting the bearing; the rotating debris trap comprising: a cylindrical chamber bound by an inner surface of a continuous wall radially disposed about a center axis at a first inner diameter; the inner surface separated from an outer surface of the continuous wall by a wall thickness; the continuous wall having a first wall end longitudinally separated along the center axis from a second wall end by a length; a plurality of grooves located between the first wall end and the second wall end; the plurality of grooves extending radially outward from the inner surface into a portion of the continuous wall; each of the plurality of grooves having a groove outer diameter that is greater than the first inner diameter; the cylindrical chamber being sealed at the first wall end by a back plate attached about a circumference of the first wall end; the cylindrical chamber being open at the second wall end through the ring opening radially disposed into a ring attached to the second wall end about a circumference of the second wall end; and the ring opening having a second inner diameter less than the first inner diameter.

In yet another aspect of the present invention a method of removing debris from a fluid comprises the steps of: rotating a debris trap comprising a ring opening about a center axis; directing the fluid in a first direction along the center axis through the ring opening of the rotating debris trap such that the fluid exits the rotating debris trap through the ring opening in a second direction opposite from the first direction; wherein a concentration of debris in the fluid exiting from the rotating debris trap is less than a concentration of debris in the fluid entering the rotating debris trap; the debris trap further comprising: a cylindrical chamber bound by an inner surface of a continuous wall radially disposed about a center axis at a first inner diameter; the inner surface separated from an outer surface of the continuous wall by a wall thickness; the continuous wall having a first wall end longitudinally separated along the center axis from a second wall end by a length; the cylindrical chamber being sealed at the first wall end by a back plate attached about a circumference of the first wall end; a plurality of grooves located between the first wall end and the second wall end; the plurality of grooves extending radially outward from the inner surface into a portion of the continuous wall; each of the plurality of grooves having a groove outer diameter that is greater than the first inner diameter; the cylindrical chamber being open at the second wall end through the ring opening radially disposed about the center axis through a ring attached to the second wall end about a circumference of the second wall end; and the ring opening having a second inner diameter less than the first inner diameter.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides for a multiple stage centrifugal separation device, generally referred to herein as a debris trap, and methods to remove debris from a fluid. In an embodiment, the present invention may be disposed integral to a system that may direct a fluid to some end use. In another embodiment, the fluid may be filtered and recycled back for use again. In yet another embodiment, the fluid in a system may be single use. This is counter to the prior art, in which debris traps may be provided in systems that recycle fluids.

In a further embodiment, the debris trap of the present invention may be integrally disposed between a means for filtration, and an intended end use of the fluid, such that the debris trap may intercept and remove debris which may not be removed by a filtration means prior to the end use. The integral disposition of the present invention may also differ from the prior art, in that debris traps may be disposed external to a component or system.

Examples of fluid systems in which an embodiment of the present invention can be used may include oil or other lubrication systems such as those which may supply lubrication oil or other types of fluid to various forms of bearings, surfaces, and other moving components. Particular examples may include apparatus which may comprise a recirculating oil lubrication system with various types of bearings such as rolling element bearings, journal bearings, and the like, such as main rotor bearings of a gas turbine, an engine, or the like. The debris trap may also be used to remove various debris from a fuel supply and/or delivery system such as those which include a fuel pump, a fuel injection system, and the like. The debris trap of the present invention may also find use in hydraulic systems, or any system in which the debris trap of the present invention may undergo rotation while in fluid communication with the fluid, prior to the fluid being delivered to an end use.

In still another embodiment, the debris trap of the present invention may comprise a cylindrical chamber rotatable about a center axis. The chamber may also be sealed at a first wall end and open at a second wall end. In an embodiment, the fluid may flow into and out of the chamber through the same opening. In yet another embodiment, the fluid may undergo a change in direction along a center axis of rotation upon entering an opening of the debris trap of the present invention, in order to exit the debris trap through the same opening. Changing the direction of the fluid within the debris trap may improve the communication between the fluid and the debris trap. This improved communication between the fluid and the debris trap may thus lesson the effect a fluid flow rate has on such communication, and may ultimately improve separation of debris from a fluid facilitated by an embodiment of the present invention. This too may be unlike the prior art, wherein a fluid may flow into an inlet of a separation chamber, and then flow out of the separation chamber through a separate outlet, which may also occur without the fluid having to undergo a change in direction or change in velocity which may impart a sufficient force due to centrifugal acceleration which may be needed to remove a contaminant particle from the fluid. Thus, the fluid may flow essentially straight through a prior art device with little or no communication between such fluid and such a device, and thus little or no effect on the fluid from a centrifugal force, especially under high flow rate conditions as determined relative to the size of the prior art device. Accordingly, unlike the present invention, fluid flow rate may have an effect on separation of debris in such a prior art apparatus.

In still another embodiment, a cylindrical chamber of the separation device of the present invention may be rotated about a center axis such that debris contained in a fluid may be preferentially accelerated against an inner surface of a continuous wall by which the cylindrical chamber may be bound. The force which may be made to act on debris may be greater than a force acting on the fluid, irrespective of whether or not the debris may be magnetic. Accordingly, an embodiment of the present invention may separate debris which may not be ferrous or otherwise subject to magnetic attraction. This may be unlike the prior art, wherein a magnetic chamber may be provided to separate ferrous debris from a fluid stream through magnetic attraction alone, while non-magnetic debris may pass through such a device without separation.

In yet another embodiment, the separation device of the present invention may comprise a cylindrical chamber having a ring opening that may have a diameter less than an outer diameter of the cylindrical chamber. Still further, an embodiment of the present invention may comprise a plurality of grooves located within a cylindrical chamber. These grooves may extend radially outward from an inner surface of a continuous wall by which the cylindrical chamber may be bound, such that each of these grooves may have an outer diameter which may be greater than an inner diameter of the continuous wall into which the grooves may be disposed. In such an embodiment, the fluid may enter the separation device and may flow over these grooves, and out of the ring opening. Debris which may be contained within the fluid may thus become trapped within these grooves due to a greater centrifugal force acting on a piece of debris positioned at a greater distance from the axis of rotation as provided by the grooves, as compared to the fluid which may be rotating at a lesser distance from this same axis of rotation. The ring opening may also provide a weir or dam which may act as a partial barrier to a material exiting the cylindrical chamber, similar to that provided by the grooves. Accordingly, the debris trap of the present invention may provide multiple traps or stages of separation within the same apparatus. This may be unlike the prior art, wherein a single chamber may be provided having a single weir or dam over which a fluid that may contain debris must flow. Thus the prior art may not provide multiple stages of separation within the same apparatus.

In an embodiment of the present invention, no special valves may be required for operation. This may be unlike the prior art, which may require additional systems such as a slide valve, commutating valve, or the like, for operation. Accordingly, an embodiment of the present invention may be included into a system with little or no complexity being added to the system.

In still another embodiment of the present invention, the separator may comprise a ring attached to an end of a cylindrical chamber having an outer diameter which may be larger than an outer diameter of the continuous wall by which the chamber of the debris trap may be bound. This ring may be positioned to provide another stage of separation of debris external to the debris trap itself by forming yet another dam or weir within a flow path of a fluid prior to a final destination such as a bearing or a conduit in fluid communication with a bearing. This too may be unlike the prior art, wherein after passing over a single dam or weir inside a rotating chamber, the fluid exiting the separation device may not be subjected to further stages of debris separation external to the trap itself.

Figure 2:
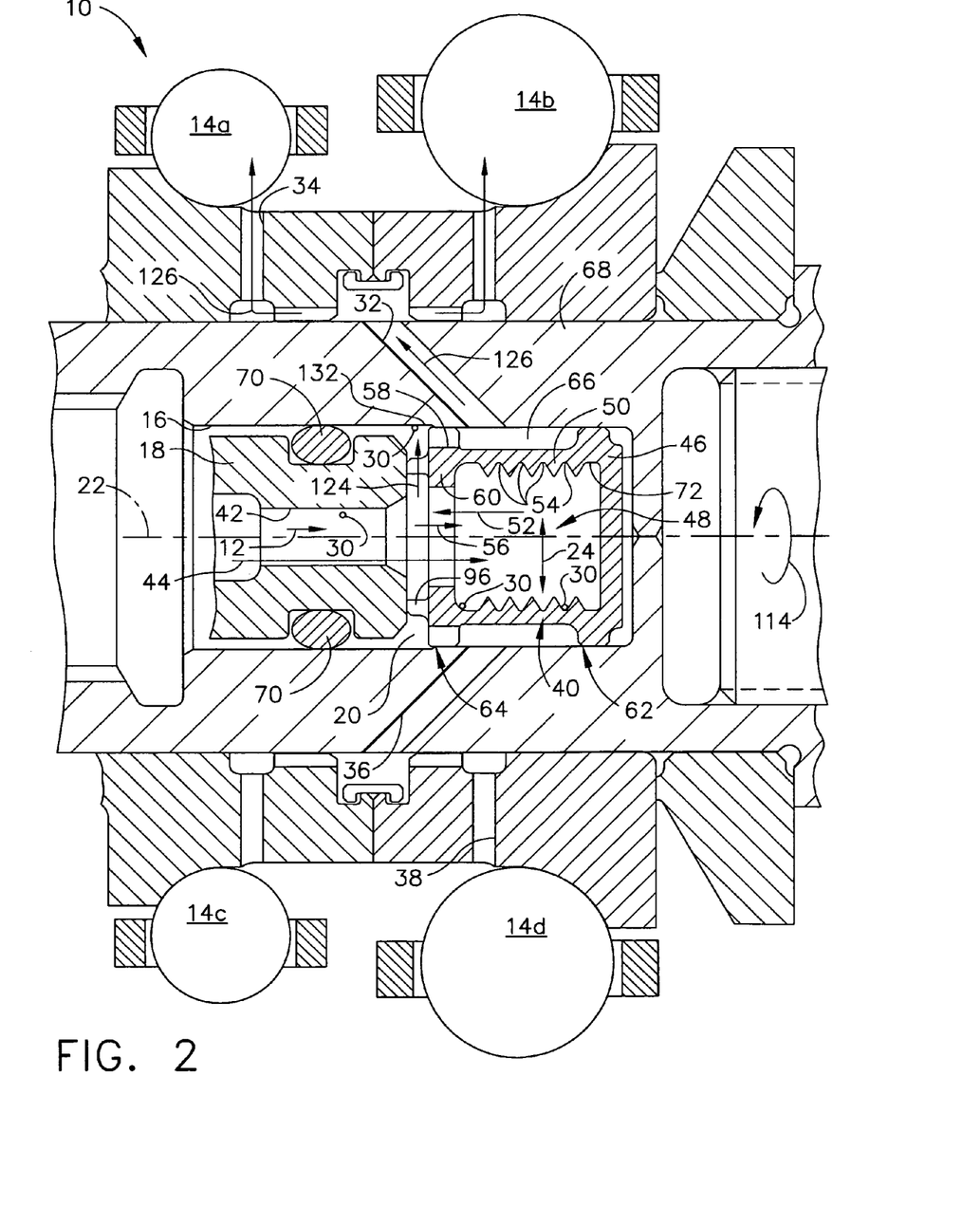
FIG. 2 is a cross-sectional plan view of a rotating shaft oil lubrication system comprising a centrifugal debris trap according to an embodiment of the present invention.

FIG. 2 is now referred to, more specifically describing the present invention. FIG. 2 shows a cross sectional plan view of a rotating shaft oil lubrication system 10 comprising an embodiment of a multi-stage centrifugal debris trap 40 of the present invention. As shown, the debris trap 40 may be disposed integral to system 10, for example, in a rotating chamber 20 located within a housing 68, which may be disposed within a rotating shaft. A fluid 12 may flow through a shaft conduit 42 within rotating spline shaft 18 along flow path 44, which may be collinear with a center axis of rotation 22, rotating at a rotational speed 114. Fluid 12 may then contact a back plate 46 of debris trap 40. Back plate 46 may be sealingly attached to, or integral with a first wall end 62 of a continuous wall 50 radially disposed about center axis 22, by which a cylindrical chamber 48 of debris trap 40 may be bound. Fluid 12 may then flow out of debris trap 40 in a direction opposite to flow path a 44 along a flow path 52 which may have a direction along center axis 22. Fluid 12 may then flow essentially perpendicular to flowpath 44 along flowpath 124. Fluid 12 may then eventually flow to bearing 14a along flowpath 126, which may be oriented in a variety of different directions as dictated by annular passage 66, conduit 32 and conduit 34. In an embodiment, once fluid 12 enters debris trap 40, the fluid may be in physical communication with grooves 54 located within debris trap 40. Fluid 12 may then flow out of debris trap 40 through a ring opening 56 disposed in a ring 60, which may be attached to a second wall end 64 of debris trap 40. The fluid 12 may then flow along flow path 52 into a rotating chamber 20, which may be sealed by an o-ring 70. From rotating chamber 20, fluid 12 may then flow along flow path 124, and then along flowpath 126 over a first outer ring diameter 58 of ring 60 into annular passage 66 which may be disposed between debris trap 40 and housing 68. The fluid 12 may then continue to flow along flow path 126 through one of a plurality of conduits 32, 34, 36, 38 (flow path not shown), such that fluid 12 becomes in contact with one or more surfaces requiring lubrication such as bearings 14a, 14b, 14c, or 14d. The fluid 12 may then be collected and filtered for reuse (not shown).

In operation of an embodiment, centrifugal force 24 provided by rotation of debris trap 40 along center axis 22 at rotational speed 114 may act on debris 30 and fluid 12 in proportion to the density of the material, and in proportion to a radial distance a particular material may be located away from center axis 22. As such, the greater the distance radially away from center axis 22 the debris 30 may be located, the greater may be the centrifugal force 24 which may act on debris 30. Accordingly, the greater distances from center axis 22 provided by grooves 54 may provide greater centrifugal force 24 acting on debris 30 within grooves 54. Likewise, the reduction in distance from center axis 22 provided by ring opening 56 may provide yet another obstruction which debris may be required to pass over, in order to exit the debris trap 40. Thus, the centrifugal force 24 acting on debris 30 located at an inner surface 72 of debris trap 40, may be greater than a force which may act on a material located at ring opening 56. Thus debris 30 may become trapped behind ring opening 56 due to a greater centrifugal force 24 acting on the debris 30 which may prevents it from exiting the debris trap 40.

Similarly, since housing 68 may also be rotating about center axis 22, an outer surface 16 of rotating chamber 20 may also provide a larger distance between center axis 22 relative to the radial distance provided by a stepped inner diameter 132 depending outward from rotating housing 68. Accordingly, debris would be required to overcome centrifugal force 24 acting on it at outer surface 16 of rotating chamber 20, in order to travel over stepped inner diameter 132, and into annular passage 66 between first outer ring diameter 58 of debris trap 40 and outer surface 16 of rotating housing 68. As such, stepped inner diameter 132 may provide yet another obstruction behind which debris 30 may be retained. The debris trap 40 may also be dimensioned so as to be removably disposed within housing 68, such that it may be removed and inspected, cleaned and/or replaced.

Figure 3:
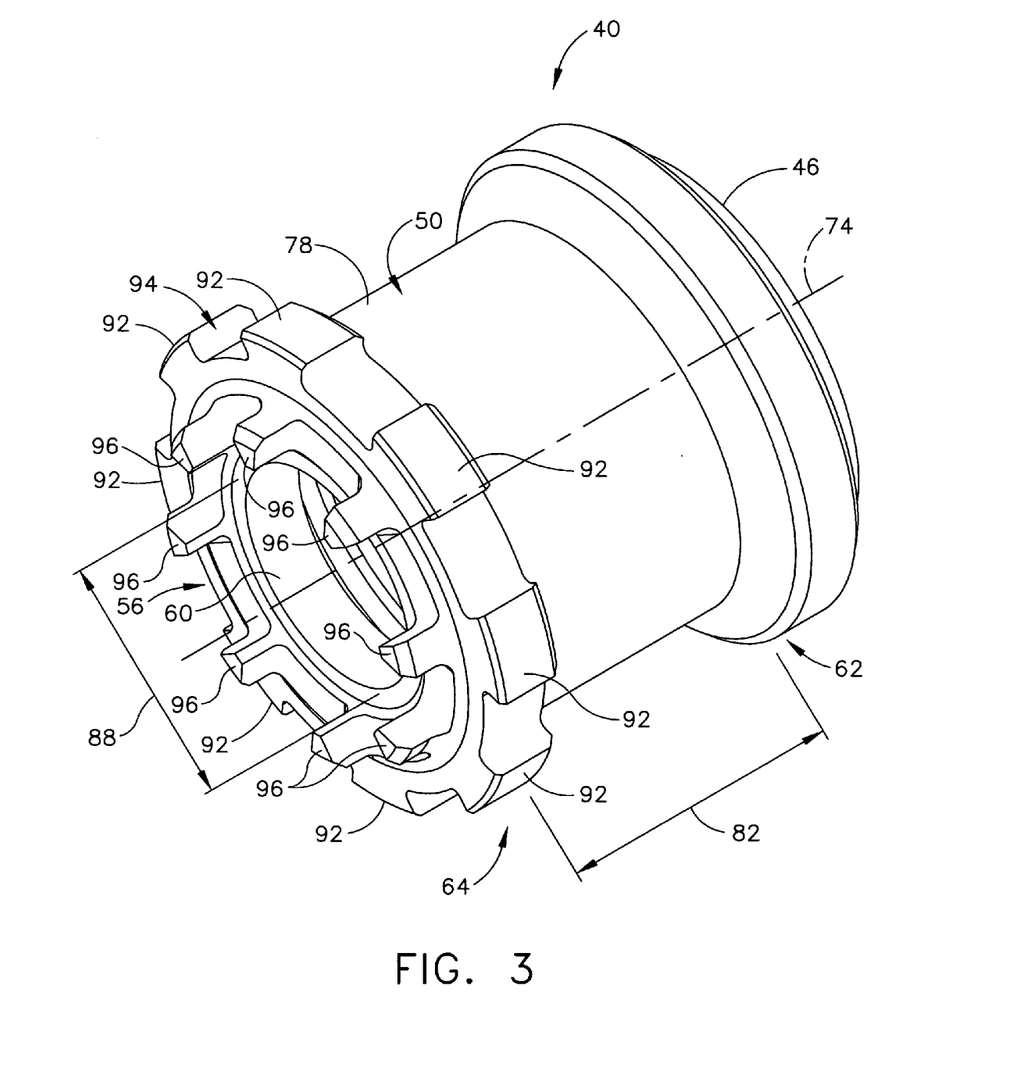
FIG. 3 is partial perspective overhead view of a centrifugal debris trap according to an embodiment of the present invention.
Figure 4:
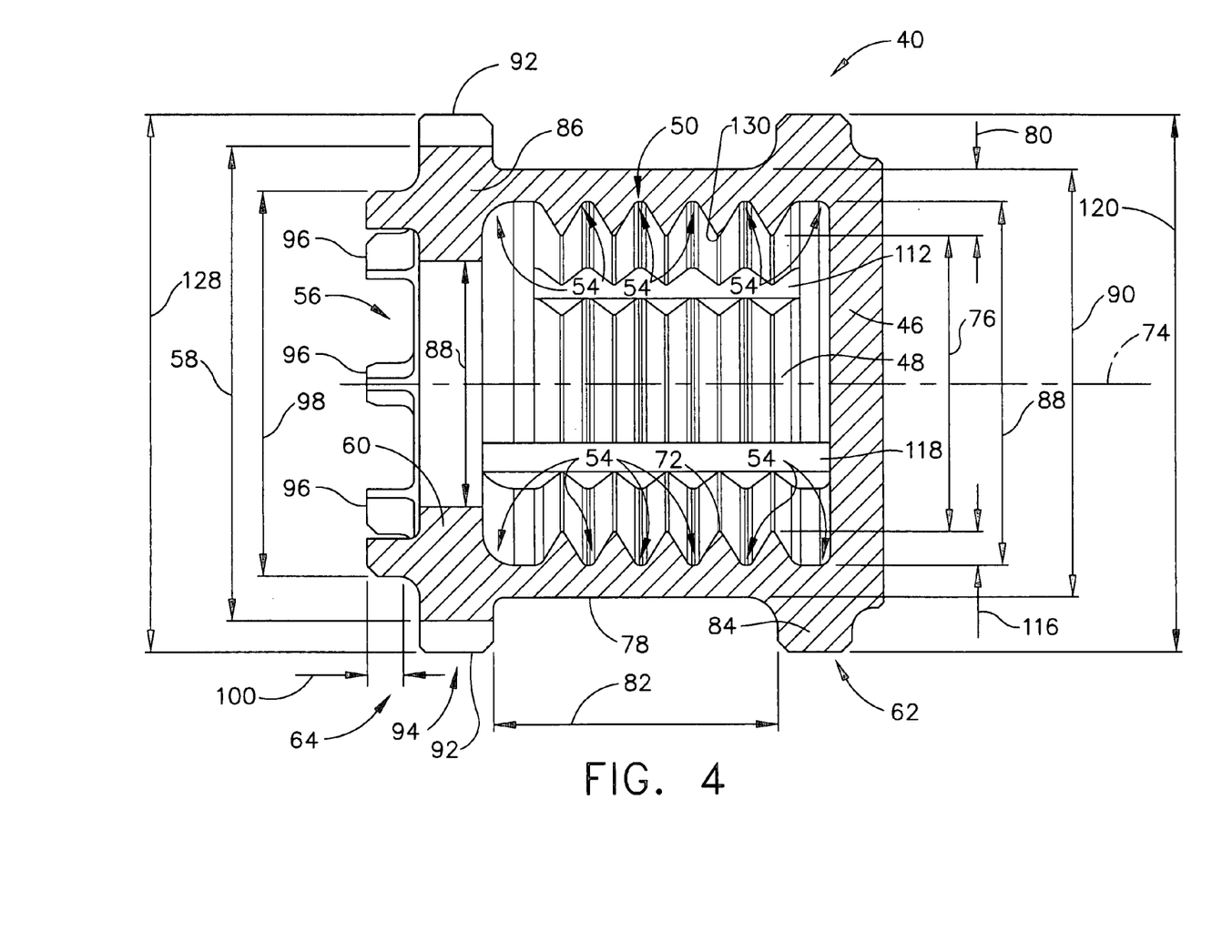
FIG. 4 is a cross-sectional side view of the centrifugal debris trap shown in FIG. 3.
Figure 5:
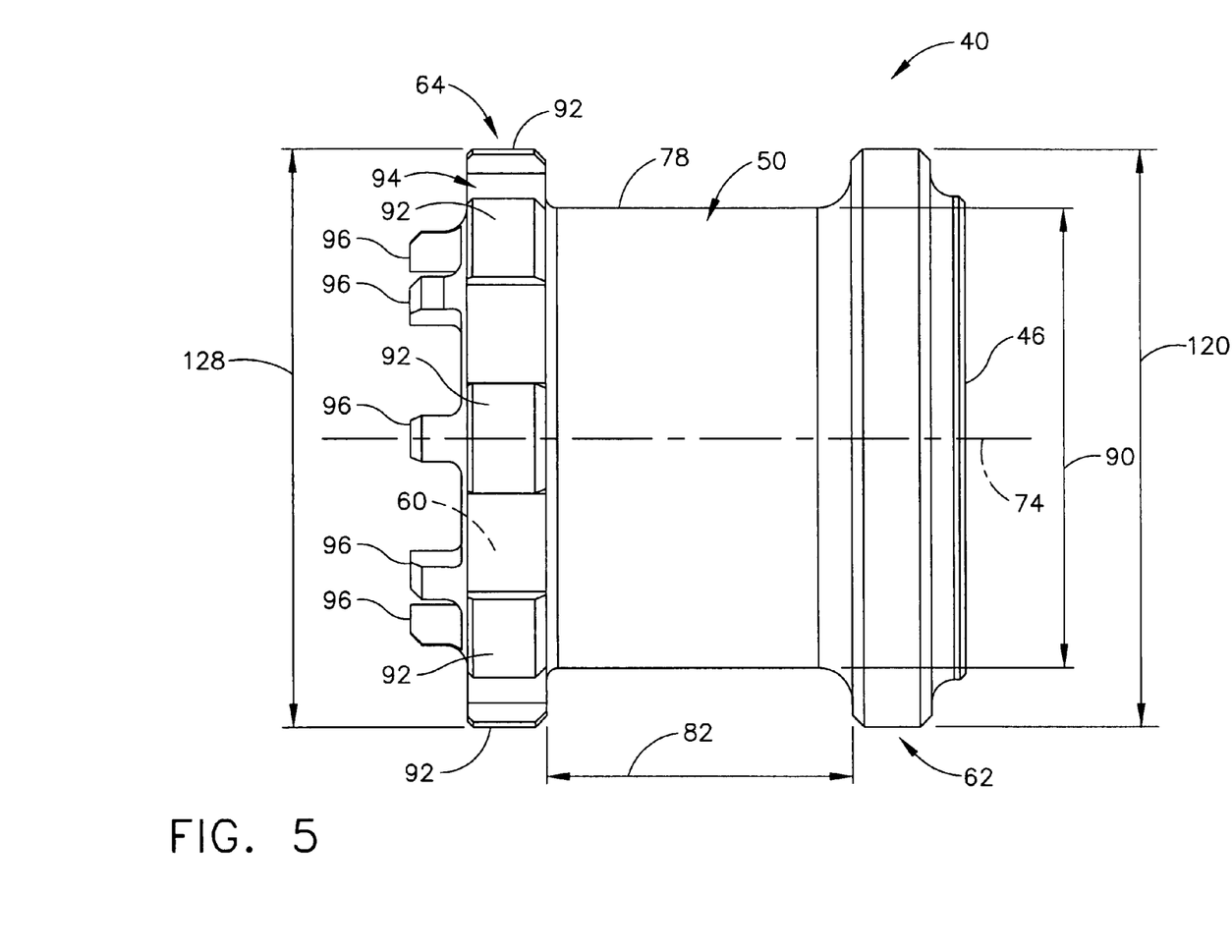
FIG. 5 is a side view of the centrifugal debris trap shown in FIG. 3.

FIGS. 3, 4, and 5, show various perspective views of an embodiment of debris trap 40. In an embodiment of the present invention, debris trap 40 may comprise a cylindrical chamber 48 which may be bound by an inner surface 72 of a continuous wall 50 radially disposed about a center axis 74 at a first inner diameter 76. The inner surface 72 may be separated from an outer surface 78 of the continuous wall 50 by a wall thickness 80. The continuous wall may have a first wall end 62 longitudinally separated along the center axis 74 from a second wall end 64 by a length 82, which may be determined from within cylindrical chamber 48 of debris trap 40.

In an embodiment, the cylindrical chamber 48 may be sealed at the first wall end 62 by a back plate 46 that may be attached about a circumference 84 of first wall end 62 of debris trap 40. The cylindrical chamber 48 may be open at second wall end 64 of debris trap 40 through a ring 60 that may be attached about a circumference 86 of second wall end 64. Ring 60 may have a ring opening 56 radially disposed about the center axis 74. The ring opening 56 may have a second inner diameter 88 which may be less than a first inner diameter 76 of the cylindrical chamber 48.

In another embodiment of the present invention, the debris trap 40 may comprise a plurality of grooves 54 located between a first wall end 62 and a second wall end 64. Each of the plurality of grooves 54 may extend radially outward from the inner surface 72 into a portion of the continuous wall 50. Each of the plurality of grooves 54 thus may have an outer diameter equal to the second inner diameter 88 that may be greater than a first inner diameter 76 of cylindrical chamber 48.

In still another embodiment, a ring 60 may have a first outer ring diameter 58 which may be greater than a wall outer diameter 90 of the outer surface 78 of the continuous wall 50. The ring 60 may also include a plurality of teeth 92 extending radially outward from the first outer ring diameter 58 of ring 60, which may form a discontinuous toothed ring 94 which may be concentric with ring opening 56. As such, the discontinuous toothed ring 94 may have a second outer ring diameter 128 which may be greater than the first outer ring diameter 58.

In still another embodiment, debris trap 40 may include a plurality of spacing teeth 96 extending longitudinally along a center axis 74. The arrangement of the spacing teeth 96 may characterize a cylinder having a spacing teeth ring outer diameter 98, which may be less than the first outer ring diameter 58. The spacing teeth 96 may extend outwardly from ring 60 by a spacing teeth length 100, which may provide a distance between rotating splined shaft 18 such that fluid 12 may flow into and out of rotating chamber 20 (see FIG. 2).

In an embodiment, the debris trap 40 may be dimensioned to be removable from housing 68. Accordingly, an outer diameter 120 of back plate 46 may be dimensioned to frictionally engage a portion of rotating chamber 20 of housing 68, so as to position debris trap 40 within a portion of rotating chamber 20. Teeth 92 may also be dimensioned such that the discontinuous toothed ring 94 may have a second outer ring diameter 128 of a dimension large enough to engage housing 68, and which may position debris trap 40 within a portion of rotating chamber 20.

Figure 6A:
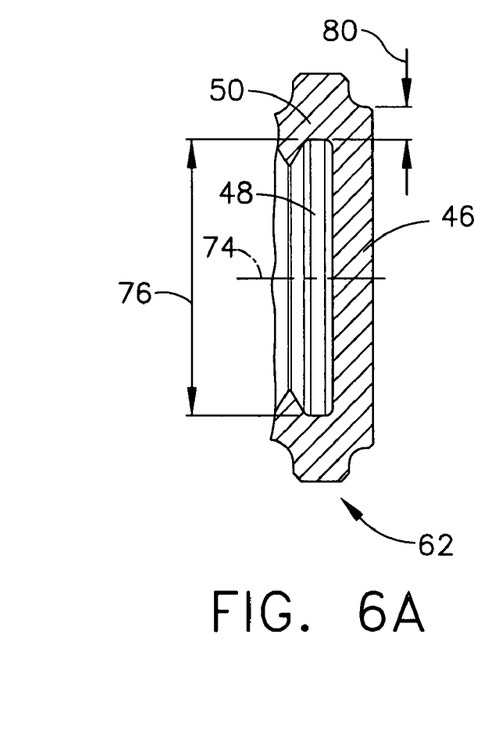
FIGS. 6a–6e each show a cross-sectional view of various embodiments of a back plate of the centrifugal debris trap of the present invention.
Figure 6B:
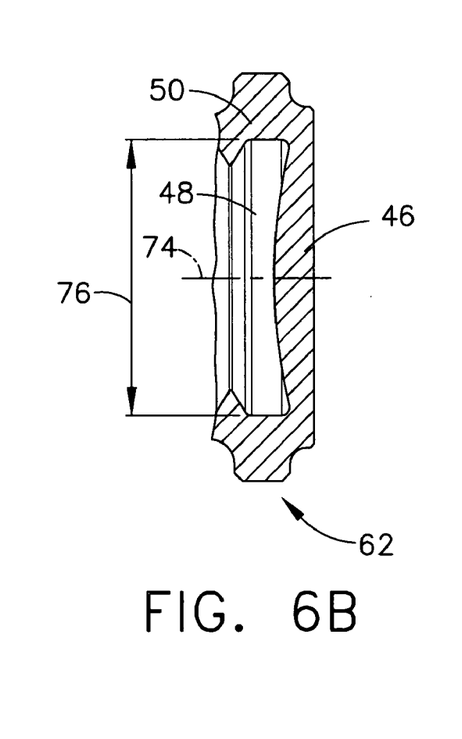
Figure 6C:
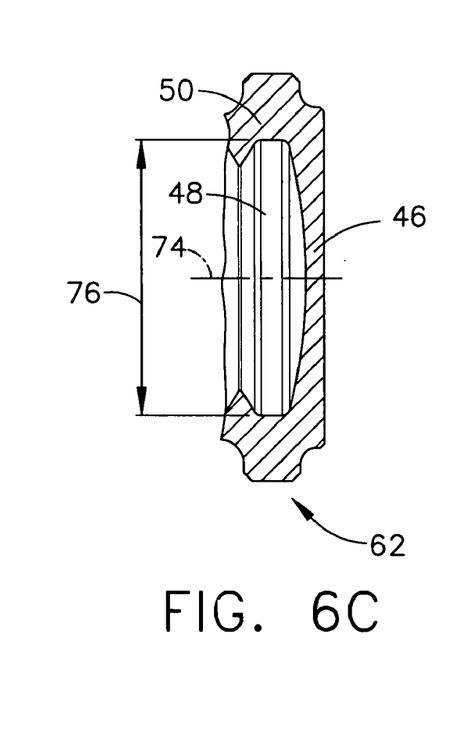
Figure 6D:
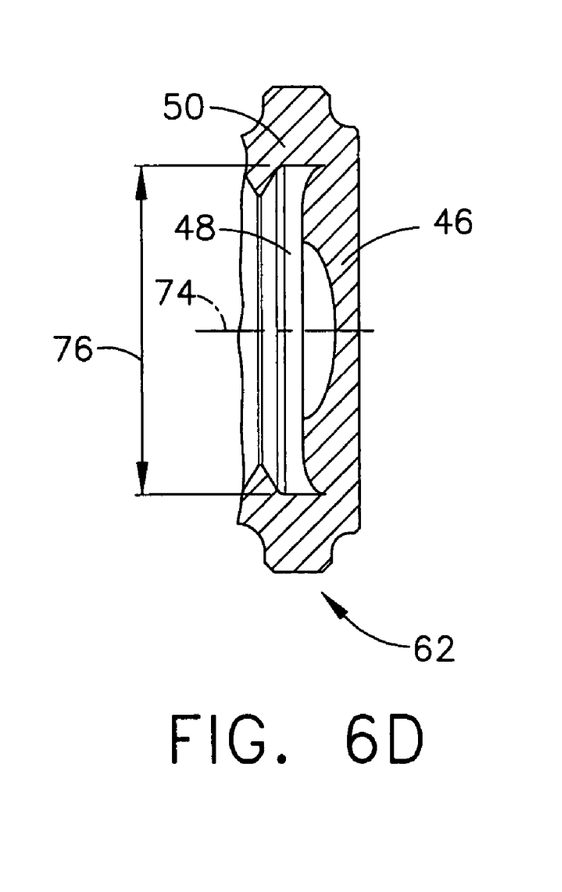
Figure 6E:
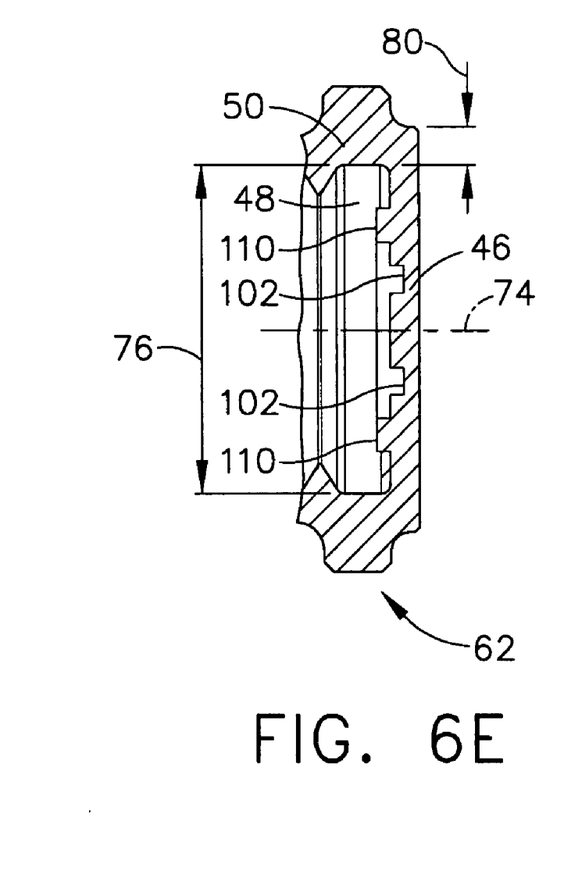

FIGS. 6a–6e show cross sections along center axis 74 of various embodiments of back plate 46. Back plate 46 may be characterized by an essentially rectangular cross section (FIG. 6a), a convex cross section (FIG. 6b), a concave cross section (FIG. 6c), or a combination thereof, for example the cross section shown in FIG. 6d. Back plate 46 may also comprise back plate appendages 110 (e.g., one or more vanes) extending outward into cylindrical chamber 48, and/or back plate grooves 102 disposed into back plate 46, as shown in FIG. 6e.

Figure 7A:
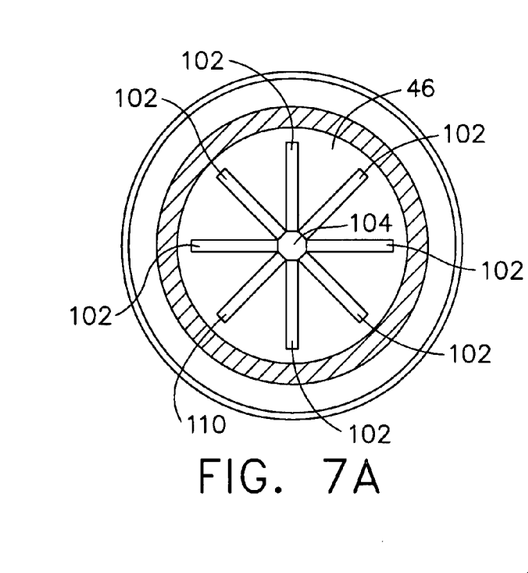
FIGS. 7a–7c each show an overhead view of various embodiments of groove arrangements on a back plate of the centrifugal debris trap of the present invention.
Figure 7B:
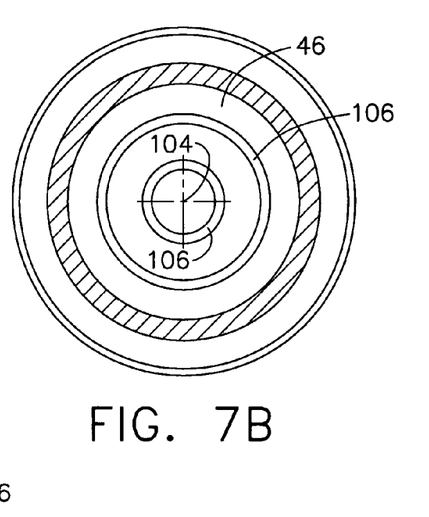
Figure 7C:
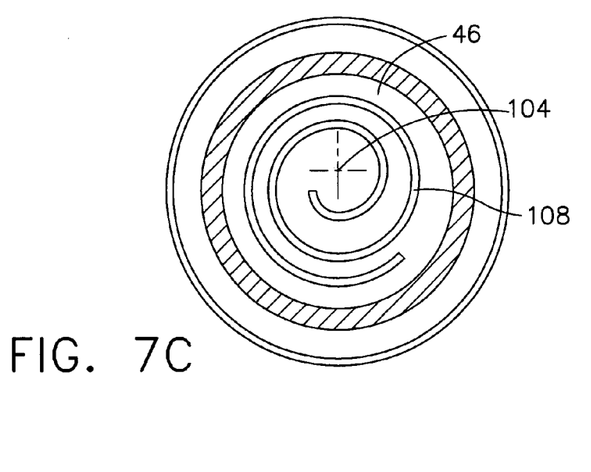
Figure 8A:
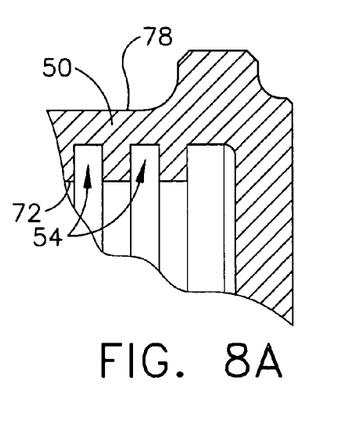
FIGS. 8a–8e each show a cross-section view of various embodiments of geometries which characterize grooves of the present invention.
Figure 8B:
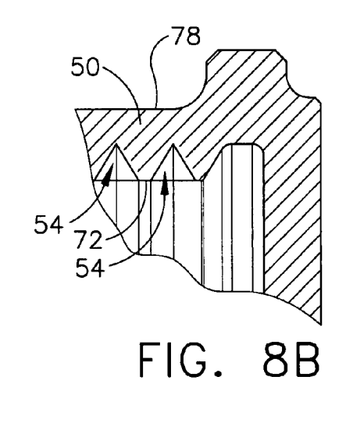
Figure 8C:
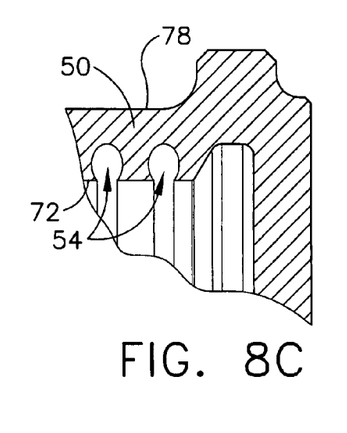
Figure 8D:
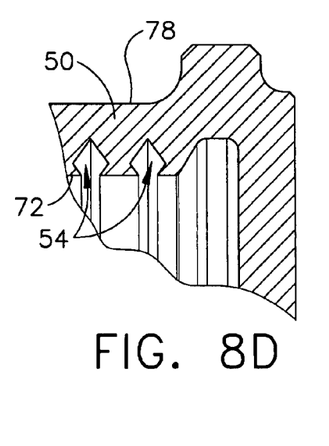
Figure 8E:
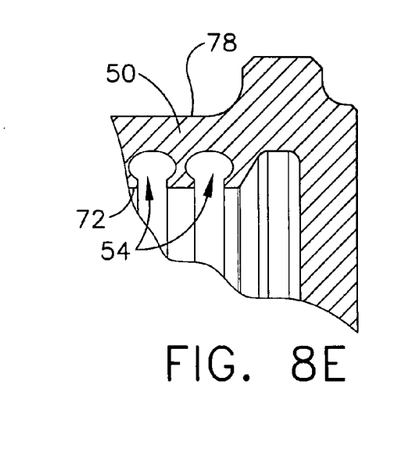

FIGS. 7a–7c show head on views of various embodiments of back plate 46, as viewed through ring opening 56 (not shown). As shown in FIGS. 7a–7c, back plate 46 may comprise back plate grooves 102, and/or back plate appendages 110 arranged in various designs therein. For example, back plate 46 may comprise a plurality of grooves 102 disposed radially outward from a back plate center point 104, through which center axis 74 (not shown) may be disposed (FIG. 7a), a plurality of continuous coaxial grooves 106 (FIG. 7b), one or more spiral shaped grooves 108 (FIG. 7c), or any combination thereof In an embodiment, the plurality of grooves 54 disposed into continuous wall 50 may each be characterized by a plurality of different cross sectional geometries. In another embodiment, each of the plurality of grooves 54 disposed into continuous wall 50 may be characterized by the same geometry. Examples of various cross sectional geometries of groove 54 are shown in FIGS. 8a–8e. Accordingly, groove 54 may be characterized by an essentially square and/or rectangular cross section (FIG. 8a), a triangular cross section (FIG. 8b), a circular cross section (FIG. 8c), or a diamond shaped cross section (FIG. 8d), or any combination thereof, such as, for example, the cross section shown in FIG. 8e. As shown in FIG. 4, the grooves 54 may also be separated by a narrow fin 130 which may also be referred to as a knife edge, which may terminate at inner surface 72.

In another embodiment, continuous wall 50 may include a plurality of longitudinal grooves 112, and/or longitudinal appendages 118, which may be disposed along, and which may be collinear to, a center axis 74 (see FIG. 4), which may also be in addition to grooves 54. Longitudinal grooves 112 may also be characterized by various cross sectional geometries as shown in FIGS. 7a–7e. Furthermore, longitudinal grooves 112 and/or longitudinal appendages 118 may be spirally arranged between first wall end 62 and second wall end 64 along continuous wall 50 (not shown). Longitudinal grooves 112 or longitudinal appendages 118 may thus be configured to improve and/or retain fluid flow through debris trap 40, which may include more rapidly bringing the fluid film up to rotational speed 114, to maximize the centrifugal force 24, and to improve debris 30 removal (i.e., filtration efficiency).

As previously noted, in an embodiment, each of the grooves 54, and the weir created by ring opening 56, may provide a means of trapping debris within debris trap 40 through application of a centrifugal force 24, which may be provided by debris 30 being disposed within debris trap 40 at a distance from a center axis of rotation 22, thus experiencing a force upon it (see FIG. 2). This centrifugal force 24 may thus retain debris 30 in place by virtue of the centrifugal force 24 being exerted on the debris 30. In an embodiment, the speed and radius needed for effective centrifugal separation may be obtained by specifying the acceleration in "g's", where one "g" may be equal to the gravitational acceleration on the earth's surface.

In an embodiment, the acceleration in g's may be related to the radius and speed of the centrifugal debris trap 40 as $g \propto r\omega^2$ where r may be defined as half the first inner diameter 76 (see FIG. 4), which may be equal to an inner wall radius of the debris trap 40. The value o may be defined as a rotational speed 114 of the debris trap 40(see FIG. 2), which may be in radians per second. To provide a radius of an embodiment in the units of inches, and obtain the output in g's, the equation may be of the form: $g's = (r\omega^2)/386.4$ In an embodiment, a centrifugal force 24 which may capture, retain and/or separate a debris 30 particle from a fluid 12 within the debris trap 40 of the present invention may be at least about 1,000 g's. A centrifugal force 24 of at least about 1,800 g's may be preferred in another embodiment, and a centrifugal force 24 of at least about 10,000 g's may be preferred in still another embodiment of the present invention.

Taking a gas turbine engine main shaft spinning at over 40,000 rpm as an example, an embodiment of the present invention having a first inner diameter 76 (shown in FIG. 4) of 0.5 inches would produce an acceleration level of over 11,000 g's. A groove 54 disposed within continuous wall 50 to produce a second inner diameter 88 of 0.7 inches (e.g., a groove depth of 0.1 inches), would produce an acceleration level of over 16,000 g's therein. Accordingly, the value of the groove depth or groove outer diameter 116 required for separation may depend on the first inner diameter 76, the rotational speed 114 of the debris trap 40, and the type of debris 30 which may be present.

In the above example, the groove depth ratio, defined herein as the groove outer diameter 116, which is equal to the second inner diameter 88 divided by the first inner diameter 76 (e.g., second inner diameter 88/first inner diameter 76) would be about 1.4 (i.e., 0.7/0.5=1.4). In an embodiment of the present invention, the groove depth ratio may be about 1.01 or greater. In still another embodiment, a groove depth ratio of 1.2 or greater may be preferred. In yet another embodiment, a groove depth ratio of 1.4 or greater may be still more preferred.

Likewise, in the above described embodiment wherein the ring 60 may have a first outer ring diameter 58 which may be greater than the wall outer diameter 90 of an outer surface 78 of a continuous wall 50 (see FIGS. 3–5), an outer ring ratio, defined herein as the first outer ring diameter 58 of ring 60 divided by the wall outer diameter 90 of outer surface 78, may be about 1.01 or greater. In still another embodiment, an outer ring ratio of 1.2 or greater may be preferred. In yet another embodiment, an outer ring ratio of 1.4 or greater may be still more preferred.

In an embodiment of the present invention, an inner diameter ring ratio may be about 1.01 or greater. The inner diameter ring ratio being defined herein as the first inner diameter 76 (of the continuous wall 50 by which the outer cylindrical chamber 48 is bound), divided by the second inner diameter 88 of ring opening 56. In still another embodiment, an inner ring ratio of 1.2 or greater may be preferred. In yet another embodiment, an inner ring ratio of 1.4 or greater may be still more preferred.

The debris trap 40 of the present invention may comprise any material which may be compatible with the fluid 12 the debris trap 40 may come in contact with. In another embodiment, the material of construction may be any such material which may maintain structural integrity at operational temperatures the debris trap 40 may be expected to encounter. Accordingly, depending on the system in which the debris trap 40 is disposed, the debris trap 40 may comprise various thermoplastic resins, thermoset resins, epoxies, polymers and the like, which may generally be referred to simply as plastics. The debris trap may also be formed from various metals, alloys, and the like, which may also be magnetic. Composite materials may also be used including organic polymer matrix fiber reinforced composites, and metal matrix composites.

A method of separating debris from a liquid stream using an embodiment of the present invention may comprise directing a liquid which may comprise debris into the rotating debris trap 40 of the present invention, through ring opening 56. The fluid 12 may be directed along a center axis 22 about which the debris trap 40 may be rotating at rotational speed 114, and may exit debris trap 40 through the same ring opening 56 after flowing in a direction which may be opposite the direction in which the fluid entered the apparatus.

It should be understood, of course, that the foregoing relates to preferred embodiments of the invention and that modifications may be made without departing from the spirit and scope of the invention as set forth in the following claims.

I claim:

1. A centrifugal debris trap comprising:
   a cylindrical chamber bound by an inner surface of a continuous wall radially disposed about a center axis at a first inner diameter; said inner surface separated from an outer surface of said continuous wall by a wall thickness;
   said continuous wall having a first wall end longitudinally separated along said center axis from a second wall end by a length;
   a plurality of grooves located between said first wall end and said second wall end;
   said plurality of grooves extending radially outward from said inner surface into a portion of said continuous wall;
   each of said plurality of grooves having a groove outer diameter that is greater than said first inner diameter;
   said cylindrical chamber being sealed at said first wall end by a back plate attached about a circumference of said first wall end;
   said cylindrical chamber being open at said second wall end through a ring attached to said second wall end about a circumference of said second wall end;
   said ring having a ring opening radially disposed about said center axis;
   said ring opening having a second inner diameter less than said first inner diameter;
   said ring having a first outer ring diameter greater than an outer diameter of said outer surface of said continuous wall;
   said ring having a plurality of teeth extending radially outward from said first outer ring diameter forming a discontinuous toothed ring concentric with said ring opening; and
   said toothed ring having a second outer ring diameter greater than said first outer ring diameter.

2. The debris trap of claim 1, wherein said back plate is characterized by at least one of an essentially rectangular cross section, a convex cross section, and a concave cross section.

3. The debris trap of claim 1, wherein said back plate may be characterized by a rectangular cross-section.

4. The debris trap of claim 1, formed from a material comprising a plastic, a metal, or a combination thereof.

5. The debris trap of claim 4, wherein said material is magnetic.

6. The debris trap of claim 1, further comprising either one or more back plate grooves disposed into a portion of said back plate in fluid communication with said cylindrical chamber, or one or mare appendages extending away from said back plate into a portion of said cylindrical chamber, or a combination thereof.

7. The debris trap of claim 6, wherein at least one of said back plate grooves and said appendages are arranged on said back plate to extend radially away from a center point of said back plate.

8. The debris trap of claim 6, wherein at least one of said back plate grooves and said appendages are circularly arranged coaxial to a center point of said back plate.

9. The debris trap of claim 1, further comprising either a spiral groove disposed into said back plate to be in fluid communication with said cylindrical chamber, or a spiral appendage extending away from said back plate into a portion of said cylindrical chamber, or a combination thereof.

10. The debris trap of claim 1, wherein said grooves are characterized by at least one of a square cross section, a rectangular cross section, a triangular cross section, a diamond shaped cross section, and a circular cross section.

11. The debris trap of claim 1, further comprising either one or more longitudinal grooves disposed into a portion of said continuous wall from said inner surface, or longitudinal appendages extending radially away from said continuous wall into a portion of said chamber, or a combination thereof, wherein said grooves, said appendages, or both are disposed longitudinally along said center axis.

12. The debris trap of claim 1, further comprising either one or more longitudinal spiral grooves disposed into a portion of said continuous wall from said inner surface, or one or more longitudinal spiral appendages extending radially away from said continuous wall into a portion of said chamber, or a combination thereof wherein said longitudinal spiral grooves, said longitudinal spiral appendages, or both, are spirally disposed along at least a portion of said wall length between said first wall end and said second wall end.

13. The debris trap of claim 1, wherein a ratio of said groove outer diameter to said first inner diameter is about 1.01 or greater.

14. The debris trap of claim 1, wherein a ratio of said first inner diameter to said second inner diameter of said ring opening is about 1.01 or greater.

15. A centrifugal debris trap comprising: a cylindrical chamber bound by an inner surface of a continuous wall concentrically disposed about a center axis at a first inner diameter;
    said inner surface separated from an outer surface of said continuous wall by a wall thickness;
    said continuous wall having a first wall end longitudinally separated along said center axis from a second wall end by a wall length;
    said cylindrical chamber being sealed at said first wall end by a back plate attached about a circumference of said first wall end;
    a plurality of grooves located between said first wall end and said second wall end;
    said plurality of grooves extending radially outward from said inner surface into a portion of said continuous wall;
    each of said plurality of grooves having a groove outer diameter that is greater than said first inner diameter;
    said cylindrical chamber being open at said second wall end through a ring attached to said second wall end about a circumference of said second wall end;
    said ring having a ring opening radially disposed about, and concentric to said center axis;
    said ring opening having a second inner diameter that is less than said first inner diameter;
    said ring having a first outer ring diameter greater than an outer diameter of said outer surface of said continuous wall;
    said ring having a plurality of teeth extending radially outward from said first outer ring diameter forming a discontinuous toothed ring concentric with said ring opening, and
    said toothed ring having a second outer ring diameter greater than said first outer ring diameter.

16. The debris trap of claim 15, wherein said first outer ring diameter divided by said outer diameter of said outer surface of said continuous wall is about 1.01 or greater.

17. The debris trap of claim 15, wherein an outer diameter of said back plate is dimensioned to frictionally engage a portion of a chamber disposed in a housing, such that said debris trap is removable from said housing.

18. The debris trap of claim 17, wherein said second outer ring diameter of said discontinuous toothed ring is dimensioned to engage a portion of said housing to position said debris trap within a portion of said chamber.

19. The debris trap of claim 15, further comprising a plurality of spacing teeth extending longitudinally along said center axis outwardly from said ring in a direction opposite of said cylindrical chamber.

20. A centrifugal debris trap comprising: a cylindrical chamber bound by an inner surface of a continuous wall concentrically disposed about a center axis at a first inner diameter;
    said inner surface separated from an outer surface of said continuous wall by a wall thickness;
    said continuous wall having a first wall end longitudinally separated along said center axis from a second wall end by a wall length; said cylindrical chamber being sealed at said first wall end by a back plate attached about a circumference of said first wall end;
    a plurality of grooves located between said first wall end and said second wall end;
    said plurality of grooves extending radially outward from said inner surface into a portion of said continuous wall;
    each of said plurality of grooves having a groove outer diameter such that a ratio of said groove outer diameter to said first inner diameter is about 1.01 or greater;
    said cylindrical chamber being open at said second wall end through a ring attached to said second wall end about a circumference of said second wall end;
    said ring having a ring opening radially disposed about, and concentric to said cylindrical chamber;
    said ring opening having a second inner diameter such that a ratio of said first inner diameter to said second inner diameter is about 1.01 or greater;
    said ring having a first outer ring diameter such that a ratio of said first outer ring diameter to an outer diameter of said outer surface of said continuous wall is about 1.01 or greater;
    said ring having a plurality of teeth extending radially outward from said first outer ring diameter fanning a discontinuous toothed ring concentric with said ring opening;
    said toothed ring having a second outer ring diameter greater than said first outer ring diameter; and
    said ring having a plurality of spacing teeth extending longitudinally along said center axis outwardly from said ring in a direction opposite of said cylindrical chamber, wherein: an outer diameter of said back plate is dimensioned to frictionally engage a portion of a chamber disposed within a housing such that said debris trap is removable from said housing, and wherein said second outer ring diameter of said discontinuous toothed ring is dimensioned to engage a portion of said housing to position said debris trap within a portion of said chamber.

21. A method of removing debris from a fluid, comprising:
    rotating a debris trap comprising a ring opening about a center axis;
    directing said fluid in a first direction along said center axis through said ring opening of said rotating debris trap such that said fluid exits said rotating debris trap through said ring opening in a second direction opposite from said first direction;

wherein a concentration of debris in said fluid exiting from said rotating debris trap is less than a concentration of debris in said fluid entering said rotating debris trap;

said debris trap comprising:

a cylindrical chamber bound by an inner surface of a continuous wall radially disposed about a center axis at a first inner diameter;

said inner surface separated from an outer surface of said continuous wall by a wall thickness;

said continuous wall having a first wall end longitudinally separated along said center axis front a second wall end by a length;

said cylindrical chamber being sealed at said first wall end by a back plate attached about a circumference of said first wall end;

a plurality of grooves located between said first wall end and said second wall end;

said plurality of grooves extending radially outward from said inner surface into a portion of said continuous wall;

each of said plurality of grooves having a groove outer diameter that is greater than said first inner diameter;

said cylindrical chamber being open at said second wall end through said ring opening radially disposed about said center axis through a ring attached to said second wall end about a circumference of said second wall end;

said ring opening having a second inner diameter less than said first inner diameter;

said ring having first outer ring diameter greater than an outer diameter of said outer surface of said continuous wall;

said ring having a plurality of teeth extending radially outward from said first outer ring diameter forming a discontinuous toothed ring concentric with said ring opening: and said toothed ring having a second outer ring diameter greater than said first outer ring diameter.

22. The method of claim 21, wherein at least a portion of said fluid entering said rotating debris trap contacts said back plate before contacting said inner surface of said continuous wall.

23. The method of claim 21, wherein said debris trap has a first inner diameter and a rotational speed to produce a force of about 1,000 g or greater at said inner surface of said continuous wall.

24. The method of claim 23, wherein said force is about 10,000 g or greater.

25. The method of claim 23, wherein said groove outer diameter of at least one of said grooves is dimensioned to produce a force greater than 1000 g within said groove at said rotational speed.

26. The method of claim 21, further comprising collecting said fluid exiting from said rotating debris trap in a reservoir for recycle.

27. The method of claim 21, wherein said fluid is a lubrication fluid, a fuel, a hydraulic fluid, or a combination thereof.

* * * * *

UNITED STATES PATENT AND TRADEMARK OFFICE
CERTIFICATE OF CORRECTION

PATENT NO. : 7,175,771 B2  Page 1 of 1
APPLICATION NO. : 10/741778
DATED : February 13, 2007
INVENTOR(S) : Eric B. Bridges It is certified that error appears in the above-identified patent and that said Letters Patent is hereby corrected as shown below:

Title Page; item (57)
Front of patent in the Abstract, line 10, "ends," should be changed to --end,--;
Column 12, line 55, "mare" should be changed to --more--;
Column 13, line 20, "thereof wherein" should be changed to --thereof, wherein--;
Column 14, line 45, "fanning" should be changed to --forming--;
Column 15, line 14, "front" should be changed to --from--;
Column 16, line 1, "having first" should be changed to --having a first--;
Column 16, line 7, "opening:" should be changed to --opening;--.

Signed and Sealed this

Twenty-sixth Day of June, 2007

JON W. DUDAS
*Director of the United States Patent and Trademark Office*